Oct. 5, 1965  A. GOLLER  3,210,135
TELESCOPIC CONSTRUCTION GUIDING MEANS
Filed Jan. 3, 1963  2 Sheets-Sheet 1

INVENTOR.
AUGUST GOLLER
BY
Woodhams Blanchard & Flynn
ATTORNEYS

Oct. 5, 1965 A. GOLLER 3,210,135
TELESCOPIC CONSTRUCTION GUIDING MEANS
Filed Jan. 3, 1963 2 Sheets-Sheet 2

INVENTOR.
AUGUST GOLLER
BY
Woodhams Blanchard & Flynn
ATTORNEYS

United States Patent Office  3,210,135
Patented Oct. 5, 1965

3,210,135
TELESCOPIC CONSTRUCTION GUIDING MEANS
August Goller, Munich, Germany, assignor to Maschinenfabrik Karl Goller KG., Munich, Germany, a corporation of Germany
Filed Jan. 3, 1963, Ser. No. 249,209
Claims priority, application Germany, Jan. 12, 1962, M 51,438
5 Claims. (Cl. 308—6)

The invention has reference to guiding means for a telescopic construction, especially as a supporting leg for height-adjustable, pedestal-type tables and chairs, with an outer part in the form of a polygonal tube, an inner part being length-adjustable with relation to the outer part and being also in the form of a polygonal tube or rod, and with friction-reducing bodies arranged between outer and inner parts and located at a corner of the outer part.

In the case of a known telescopic construction of this kind, which serves for the guidance of a drawer, the outer as well as the inner parts have a quadratic shape. The inner part is turned 45 degrees with respect to the outer part, so that the friction-reducing bodies constructed as balls and arranged in the corners of the outer part lie against a level side surface of the inner part. Such a telescopic construction guiding means may be sufficient for the exactness required for the guidance of a drawer. However, an exact longitudinal guiding of the two parts with relation to each other, as is required for instance in the case of supporting legs of height-adjustable tables or seating furniture, cannot be achieved with friction-reducing bodies lying against the level surface of the inner part. Especially it cannot be prevented by this method that the inner part turns somewhat with relation to the outer part, so that in the case of telescopic constructions, working on the winding principle there is a danger of getting stuck.

In the case of telescopic constructions a method has been developed according to which opposite grooves have been cut in the outer and inner parts and friction-reducing bodies are inserted into these grooves. Thus, an exact longitudinal guidance can be achieved, but these grooves weaken the two parts of the telescopic construction. This disadvantage is very important, for instance, in the case of supporting legs of seating furniture, which are very often in danger of bending by an eccentric loading of the seating surface. Because of these grooves it is necessary to construct the parts of the telescopic construction in a very strong fashion, as a result of which the weight of the furniture is greatly and undesirably increased. In addition the cutting of the grooves into the guiding parts requires a substantial amount of work.

It is the purpose of the invention to provide a guiding means for a telescopic construction of the originally mentioned kind in such a manner that in spite of a very exact guidance no weakening of the parts of the telescopic construction occurs. According to the present invention this is accomplished by providing each friction-reducing body with a groove into which for the purpose of guiding the inner part a corner of the latter enters.

For the telescopic construction according to the invention it is possible to use ordinary tubes or rods of a polygonal cross section which do not have to be processed any further. Thus, the cross section is preserved unchanged, so that the parts, even when they are of relatively small weight, have a sufficient degree of rigidity. An exact guidance of the two parts with relation to each other is brought about by the insertion of the corner of the inner part into a groove of the friction-reducing body resting in a corner of the outer part. This also and especially prevents a relative turn of the two parts with respect to each other.

The drawings show preferred embodiments of the invention.

Figure 1:
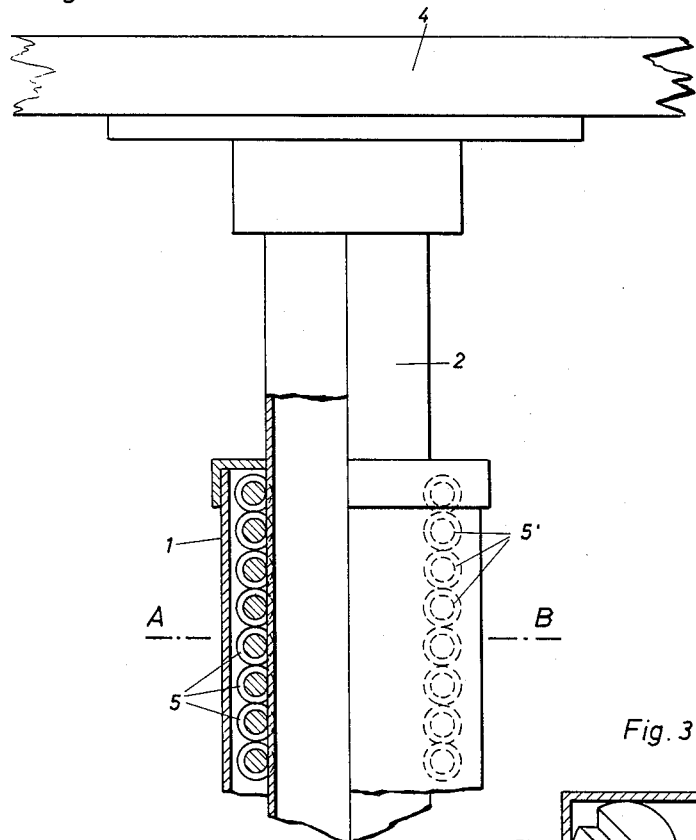
FIGURE 1 is a side view, partially broken away, showing a telescopic construction according to the invention.

The construction example shown in the drawings deals with a telescope-like supporting leg of a pedestal-type, height-adjustable table. This supporting leg comprises as the outer part of the telescopic construction a guidance tube 1 and as the inner part a supporting tube 2. The table top 4 is firmly connected with supporting tube 2. Both tubes have a prismatic form and can be of a variety of polygonal shapes, of which the quadratic shape shown in the drawings is effective. Friction-reducing bodies 5 are arranged between guide tube 1 and the supporting tube 2 in such a manner that they lie in the corners of guidance tube 1.

According to the invention, the friction-reducing bodies are each equipped with groove 5', into which enters one angular edge of the supporting tube 2. This occurs in such a manner that both side walls of the groove lie against the surface of the supporting tube, so that the supporting tube is guided without play in the guide tube and is secured against turning.

Figure 2:
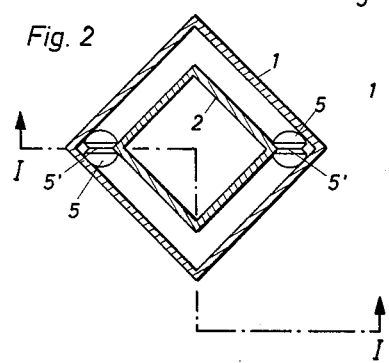
FIGURE 2 is a sectional view through the telescopic construction according to FIGURE 1 taken along the line A–B.
Figure 3:
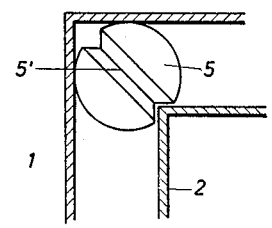
FIGURE 3 shows a detail of the telescopic construction on an enlarged scale.

In the construction example according to FIGURES 1–3, friction-reducing bodies of the ball-type are provided, each of which is provided with a peripheral groove.

Figure 4:
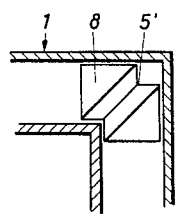
FIGURE 4 is a fragmentary sectional view showing a modification of a telescopic construction according to the present invention using double cone-shaped rollers.

If even greater exactness in guidance is required, it is possible to use double cone-shape rollers 8 in place of balls, in which case the cone surfaces lie against the inner surface which define the corner of guide tube 1 (as shown in FIGURE 4). Groove 5' of the friction-reducing bodies can be provided with an angle cross section corresponding to the angle form of the corner of the inner part (as shown in FIGURES 1–4).

Figure 5:
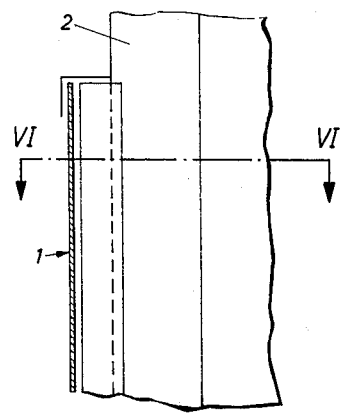
FIGURE 5 is a view taken along the line V—V in FIGURE 6 of a further modification using a sliding rod.
Figure 6:
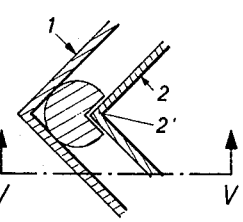
FIGURE 6 is a sectional view taken along the line VI—VI of FIGURE 5.

The telescopic construction can be made particularly simple and inexpensive when sliding bodies are used as friction-reducing bodies, such as where simple cylindrical rods are used. This possibility is demonstrated in FIGURES 5 and 6. Here a cylindrical rod 9 with a longitudinal groove 5" is arranged in the corner of guide tube 1. Corner 2' of the supporting tube enters into this groove.

In order to achieve a guiding completely without play, while still using a simple means, it is advantageous to construct either the outer tube 1 or the inner tube 2, or both, such that they can be resiliently deformed in a direction transverse to the lengthwise extent thereof and to arrange the sizes so that the friction-reducing bodies can be introduced into the space between the two guiding parts only by deforming the resilient part. After the deformation force is removed, the friction-reducing members are under pressure produced by the resilience of the resilient part so that there can be no play in the guiding means.

Figure 7:
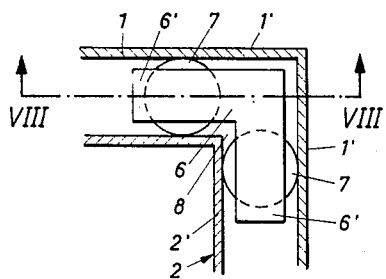
FIGURE 7 is a sectional view of another modification.
Figure 8:
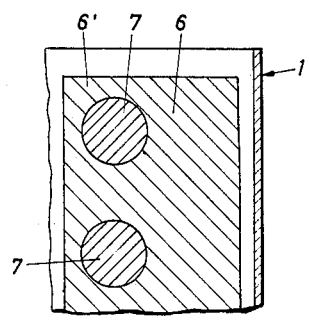
FIGURE 8 is a sectional view taken along the section line VIII—VIII in FIGURE 7.

The construction example according to FIGURES 7–8 again provides a guide tube 1 and a support tube 2 which both show a polygonal cross section. A friction-reducing body is arranged in the corner 1' of the guide tube 1. In the construction example according to FIGURE 7 this body consists of an angular cage 6 which embraces the edge 2' of the supporting tube 2. Suitable rolling bodies 7, such as balls or rollers, are located in sides 6' of the angular cage, which sides extend parallel to the walls of the supporting tube and the guide tube and are positioned in the space between these walls. Corner 2' of supporting tube 2 enters into a groove-like space 8 which is present in the corner of the cage 6 because of the spacing of balls 7 from each other. As shown in FIGURES 7–8, supporting tube 2 is longitudinally guided in guide tube 1 with greater exactness. Neither a side displacement nor a turning of the supporting tube with relation to guiding tube 1 is possible. A special advantage of construction according to FIGURES 7–8 consists of the fact that no groove needs to be formed in the rolling bodies 7, because the space between the bodies acts as a groove. This means that the production of the telescopic construction is simplified.

Although particular preferred embodiments of the invention have been disclosed above for illustrative purposes, it will be understood that variations or modifications thereof which lie within the scope of the appended claims are fully contemplated.

What is claimed is:

1. A telescopic construction, comprising: an elongated tubular outer part having a central opening which is polygonal in cross section; an elongnated inner part whose outer surface is polygonal in cross section, said inner part being slideably disposed within said outer part for longitudinal movement with respect thereto, said outer surface being spaced from the wall defining said central opening and at least two corners of said inner part being aligned with and opposed to corresponding corners of said central opening; friction-reducing bodies disposed in the space between said opposing corners of said inner and outer parts, said friction-reducing bodies comprising balls each having a peripheral groove therein into which the adjacent corner of the inner part projects whereby to guide the longitudinal movement of the inner part, the balls in the respective pairs of opposing corners being independent of and free from connection with the balls in the other pairs of opposing corners.

2. A telescopic construction, comprising: an elongated tubular outer part having a central opening which is polygonal in cross section; an elongated inner part whose outer surface is polygonal in cross section, said inner part being slideably disposed within said outer part for longitudinal movement with respect thereto, said outer surface being spaced from the wall defining said central opening and at least two corners of said inner part being aligned with and opposed to corresponding corners of said central opening; friction-reducing bodies disposed in the space between said opposing corners of said inner and outer parts, said friction-reducing bodies comprising double-cone-shaped rollers each having a peripheral groove between the cones thereof into which the adjacent corner on the inner part projects whereby to guide the longitudinal movement of the inner part, the double-cone-shaped rollers in the respective pairs of opposing corners being independent of and free from connection with the double-cone-shaped rollers in the other pairs of opposing corners.

3. A telescopic construction, comprising: an elongated tubular outer part having a central opening which is polygonal in cross section; an elongated inner part whose outer surface is polygonal in cross section, said inner part being slideably disposed within said outer part for longitudinal movement with respect thereto, said outer surface being spaced from the wall defining said central opening and at least two corners of said inner part being aligned with and opposed to corresponding corners of said central opening; friction-reducing bodies disposed in the space between said opposing corners of said inner and outer parts, said friction-reducing bodies comprising slideable cylindrical rods each having a longitudinal groove therein into which the adjacent corner of the inner part projects whereby to guide the longitudinal movement of the inner part, the cylindrical rods in the respective pairs of opposing corners being independent of and free from connection with the rods in the other pairs of opposing corners.

4. A telescopic construction, comprising: an elongated tubular outer part having a central opening which is polygonal in cross section; an elongated inner part whose outer surface is polygonal in cross section, said inner part being slideably disposed within said outer part for longitudinal movement with respect thereto, said outer surface being spaced from the wall defining said central opening and at least two corners of said inner part being aligned with and opposed to corresponding corners of said central opening; friction-reducing bodies disposed in the space between said opposing corners of said inner and outer parts, said friction-reducing bodies each having a groove into which the adjacent corner on the inner part projects whereby to guide the longitudinal movement of the inner part, said groove having a cross section corresponding to the shape of the adjacent corner of the inner part, the friction-reducing bodies in the respective pairs of opposing corners being independent of and free from connection with the friction-reducing bodies in the other pairs of opposing corners.

5. A telescopic construction, comprising: an elongated tubular outer part having a central opening which is polygonal in cross section; an elongated inner part whose outer surface is polygonal in cross section, said inner part being slideably disposed within said outer part for longitudinal movement with respect thereto, said outer surface being spaced from the wall defining said central opening and at least two corners of said inner part being aligned with and opposed to corresponding corners of said central opening; friction-reducing bodies disposed in the space between said opposing corners of said inner and outer parts, said friction-reducing bodies each having a groove into which the adjacent corner on the inner part projects whereby to guide the longitudinal movement of the inner part, the friction-reducing bodies in the respective pairs of opposing corners being independent of and free from connection with the friction-reducing bodies in the other pairs of opposing corners, at least one of the outer and inner parts being resilient and constructed so that it can be resiliently deformed in a direction transverse to the longitudinal axis thereof and being of such size that after the introduction of the friction-reducing bodies between the outer and the inner parts accompanied by a deformation of the resilient part, the bodies are under a pressure exerted thereon by the resilient part.

References Cited by the Examiner

UNITED STATES PATENTS

| 206,648 | 7/78 | Tucker | 308—6 |
|---|---|---|---|
| 599,429 | 2/98 | Webb | 308—6 X |
| 1,761,123 | 6/30 | Gruver | 308—6 |
| 1,798,257 | 3/31 | Hansen | 308—3 |
| 1,841,032 | 1/32 | Hutchinson | 308—6 |
| 2,617,693 | 11/52 | Stafford | 308—3.6 |
| 2,846,278 | 8/58 | Blazek. | |
| 2,889,180 | 6/59 | Jorgensen. | |
| 3,013,849 | 12/61 | Tanner | 308—3.8 |
| 3,045,724 | 7/62 | Mitchell. | |
| 3,079,614 | 3/63 | Jackson | 308—6 |

FOREIGN PATENTS

| 1,059,642 | 11/53 | France. |
|---|---|---|
| 1,266,350 | 5/61 | France. |

DON A. WAITE, *Primary Examiner.*

ROBERT C. RIORDON, *Examiner.*